(12) United States Patent
Watanabe (10) Patent No.: US 11,173,371 B2
(45) Date of Patent: Nov. 16, 2021

(54) TOOL FOR RECORDING NUMBER OF SWINGS IN BALL GAME

(71) Applicant: NDC CORPORATION, Tokyo (JP)

(72) Inventor: Masaei Watanabe, Musashimurayama (JP)

(73) Assignee: NDC CORPORATION, Tokyo (JP)

( * ) Notice: Subject to any disclaimer, the term of this patent is extended or adjusted under 35 U.S.C. 154(b) by 404 days.

(21) Appl. No.: 15/778,893

(22) PCT Filed: Sep. 2, 2016

(86) PCT No.: PCT/JP2016/075835
§ 371 (c)(1),
(2) Date: May 24, 2018

(87) PCT Pub. No.: WO2017/098761
PCT Pub. Date: Jun. 15, 2017

(65) Prior Publication Data
US 2018/0264343 A1    Sep. 20, 2018

(30) Foreign Application Priority Data
Dec. 11, 2015  (JP) .............................. JP2015-241908

(51) Int. Cl.
*A63B 71/06*  (2006.01)
*G09B 1/14*  (2006.01)
(Continued)

(52) U.S. Cl.
CPC .............. *A63B 71/06* (2013.01); *A63B 57/00* (2013.01); *A63B 71/0672* (2013.01); *G06C 1/00* (2013.01);
(Continued)

(58) Field of Classification Search
CPC . G06C 1/00; G06M 1/22; A44C 23/00; A63F 2011/0069; G09B 1/14;
(Continued)

(56) References Cited

U.S. PATENT DOCUMENTS 1,694,703 A * 12/1928 Doppenschmitt ...... A44C 5/025
                                              63/11
1,979,585 A * 11/1934 Thompson ......... A63B 71/0672
                                              235/123
(Continued)

FOREIGN PATENT DOCUMENTS

CN            2522955 Y    11/2002
CN          202111845 U    1/2012
(Continued)

OTHER PUBLICATIONS

International Search Report for PCT/JP2016/075835, dated Oct. 25, 2016.

*Primary Examiner* — Sebastiano Passaniti
(74) *Attorney, Agent, or Firm* — Pearne & Gordon LLP (57) ABSTRACT

This tool for recording the number of swings in a ball game includes a plurality of holed beads 20 and a cord 30 that is passed through the holes 20H of the beads 20 and that holds the beads 20 so that the beads 20 can slide, the cord 30 is formed from a cord material that does not stretch in an axial direction but that stretches in a diametrical direction and that is normally urged in a diameter-expanding direction, and the cord 30 constrict in diameter so as to elastically interlock with the walls of the holes 20H of the beads 20 and hold the beads 20 in position, whereby the beads do not shift even if a player strongly shakes the tool, the number of swings in the ball game can be reliably recorded and confirmed, and the tool is easily assembled.

9 Claims, 9 Drawing Sheets

(51) Int. Cl.
*A63B 57/00* (2015.01)
*A63B 71/14* (2006.01)
*A63B 102/32* (2015.01)
*G06C 1/00* (2006.01)
*G06M 1/22* (2006.01)
*A44C 23/00* (2006.01)
*A63B 57/20* (2015.01)
*A63F 11/00* (2006.01)
*A63B 102/02* (2015.01)

(52) U.S. Cl.
CPC ............... *G06M 1/22* (2013.01); *G09B 1/14* (2013.01); *A44C 23/00* (2013.01); *A63B 57/20* (2015.10); *A63B 71/146* (2013.01); *A63B 2071/0602* (2013.01); *A63B 2071/0661* (2013.01); *A63B 2071/0663* (2013.01); *A63B 2071/0694* (2013.01); *A63B 2102/02* (2015.10); *A63B 2102/32* (2015.10); *A63B 2220/17* (2013.01); *A63F 2011/0069* (2013.01)

(58) Field of Classification Search
CPC ..... A63B 71/06; A63B 71/0672; A63B 57/00; A63B 71/146; A63B 2102/32; A63B 2071/0663; A63B 57/20; A63B 2071/0661; A63B 2220/17; A63B 2102/02; A63B 2071/0602; A63B 2071/0694
USPC ........... 235/1 B; 434/203, 204; 63/3, 38, 11; 116/278, 307; 473/205, 131, 207
See application file for complete search history.

(56) References Cited

U.S. PATENT DOCUMENTS

| | | | | |
|---|---|---|---|---|
| 3,656,749 | A * | 4/1972 | Reyes | A63B 63/08 473/485 |
| 4,237,702 | A * | 12/1980 | Caverly | A44C 11/007 24/314 |
| 4,448,579 | A * | 5/1984 | Currie | G09B 19/02 434/203 |
| 4,637,962 | A * | 1/1987 | Albrecht | B32B 15/01 228/262.3 |
| 4,912,307 | A | 3/1990 | Shade et al. | |
| 5,205,747 | A * | 4/1993 | Tan | G06C 1/00 434/203 |
| 5,395,245 | A * | 3/1995 | Heinz | G06C 1/00 223/48 |
| 5,772,484 | A * | 6/1998 | Sikorski | B63B 34/00 441/81 |
| 6,148,443 | A * | 11/2000 | Maastricht | A63B 57/0032 2/69 |
| 6,557,376 | B2 * | 5/2003 | Pratt | A44C 11/002 63/23 |
| 7,153,138 | B2 * | 12/2006 | Charles | A44C 5/0015 434/127 |
| 7,313,929 | B2 * | 1/2008 | Lazor | A44C 5/0007 116/278 |
| 7,625,230 | B2 * | 12/2009 | Boerner | H01R 13/6335 439/484 |
| 8,105,088 | B2 * | 1/2012 | Charles | A44C 5/0015 434/127 |
| 9,451,813 | B1 * | 9/2016 | Cipolla | A44C 27/001 |
| 9,730,493 | B2 * | 8/2017 | Teifer | A43C 11/08 |
| 2001/0043664 | A1 * | 11/2001 | Grant | G06C 1/00 377/24.2 |
| 2002/0197590 | A1 * | 12/2002 | Gan | G09B 19/02 434/203 |
| 2003/0141327 | A1 * | 7/2003 | Cruise | G09F 19/00 224/182 |
| 2008/0148620 | A1 | 6/2008 | Spaulding | |
| 2012/0285204 | A1 | 11/2012 | Coleman | |
| 2013/0305782 | A1 * | 11/2013 | Butler | A44C 27/00 63/12 |
| 2014/0185416 | A1 * | 7/2014 | Sanchez | A61B 10/0012 368/10 |

FOREIGN PATENT DOCUMENTS

| | | |
|---|---|---|
| JP | S60-144473 U | 9/1985 |
| JP | S627109 A | 1/1987 |
| JP | H09313661 A | 12/1997 |
| JP | 2004065765 A | 3/2004 |
| JP | 3148608 U | 2/2009 |

* cited by examiner

PRIOR ART

TOOL FOR RECORDING NUMBER OF SWINGS IN BALL GAME

TECHNICAL FIELD

The present invention relates to a tool for recording the number of swings in a ball game such as, e.g., golf, tennis, or baseball, and relates to a swing number recording tool suitable for recording, e.g., the number of swings at each hole during golf play.

BACKGROUND ART

For sports that involve playing a ball game depending on the number of swings, such as golf and tennis, there have been proposed various swing number recording tools that can consistently and reliably confirm the number of swings by recording the number of swings (for example, see Patent Document 1).

The swing number recording tool (counter) disclosed in Patent Document (Japanese Laid-open Patent Application No. 1997(Heisei 09)-313661) comprises an axially stretchable cord (string) 3 that can be stretched in an axial direction and that is attached to the back-of-the-hand-side surface of a golf glove so as to stretch across a back-of-the-hand surface portion corresponding to the fingers excluding the thumb, and a plurality of beads (counter beads) 4 that have holes through which the cord 3 is loosely passed and that are held so as to slide freely over the cord 3. In this swing number recording tool, before the start of play at each hole, the beads 4 are placed in alignment near one side of the glove; for example, preferably on the left side in the case of a right-handed player, and with each golf swing, the rightmost bead is moved along the cord 3 to the right end, this action is sequentially repeated, and the number of swings is confirmed from the number of beads that have been placed near the right side.

This swing number recording tool of Patent Document 1 functions such that, using the elasticity (axial-direction stretching ability) of the cord 3, the cord 3 pushes the beads against the back of the hand of the glove so that the beads 4 do not shift along the cord 3 during play.

With a swing number recording tool having this structure, the force by which the cord pushes on the back of the player's hand through the glove is used to hold the beads in prescribed positions on the cord. Therefore, when a great amount of deflection is caused in the tool by an action such as a strong swing of the golf club by the player, centrifugal force acts on the cord and the beads sometimes shift on the cord, which therefore creates a risk that the swing number record will be mistaken and it will not be possible to accurately confirm the record.

The swing number recording tools having this structure need a hard receiving face on the back of the hand for the cord to push on the beads, and therefore have had a drawback in that the tool cannot be alone used while being separated from the glove and without the hard receiving face.

Figure 9:
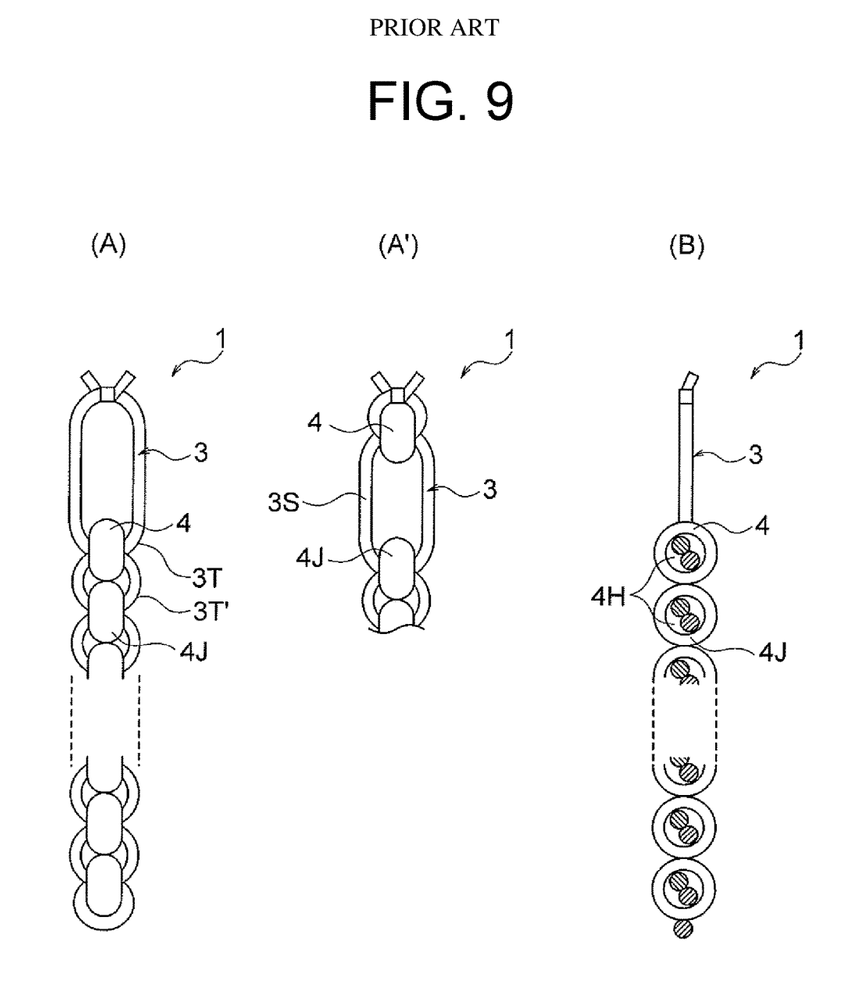
FIG. 9 shows a bead counter, made by Lite Corp., according to the prior art, wherein FIG. 9(A) being a front view thereof, FIG. 9(A') is a front view of a state of use.

Another prior-art swing number recording tool is manufactured and sold as a product called a bead counter by Lite Corporation (referred to as Lite Corp. later), and this counter 1 comprises a plurality of holed beads 4 and a stranded wire cord 3 that is interlaced from opposite directions through holes 4H in the beads 4 and that holds the beads 4 between adjacent intersecting portions of the strand, as shown in FIGS. 9(A), 9(A'), and 9(B). This tool can, for example, be carried by being hung from a location such as the band of a player's pants.

In this Lite Corp. swing number recording tool as well, a bead 4 is moved along the stranded cord with each swing, but in this case, the beads 4 are configured so that stranded portions 3T, 3T' passing through the holes 4H in opposite directions are shifted in the movement direction of the beads 4 so that the cord portion between one bead 4 and an adjacent bead 4J becomes a linear portion 3S, as shown in FIG. 9(A').

In the Lite Corp. swing number recording tool 1, because the beads 4 are restrained in the axial direction of the cord 3 by the stranded intersecting portions 3T, 3T' passing through in opposite directions of the cord 3, the beads 4 are reliably held in the swing number recording positions even if great deflection in the tool is caused by an action such as rotation of the player's body during playing, and there is no confusion over the swing number record nor is there mistaken confirmation.

However, this Lite Corp. tool made has had drawbacks in that because the strands are passed from opposite directions through the holes 4H of the beads 4 and held in the cord, assembling the tool is complicated and troublesome and manufacturing costs are high.

PRIOR ART DOCUMENTS

Patent Documents

[Patent Document 1] Japanese Laid-open Patent Application No. 1997 (Heisei 09)-313661

DISCLOSURE OF THE INVENTION

Problems to Be Solved by the Invention

The problem to be solved by the present invention is to provide a tool for recording the number of swings in a ball game in which the beads do not shift even if the player strongly swings the tool, the number of swings for the ball game can therefore be accurately recorded and confirmed, and the number of swings can be reliably recorded even if the tool is used independent of a glove or the like and there is no hard receiving face on a location such as the back of the player's hand.

Means to Solve the Problems

The means for solving the problems of the present invention is to provide a tool for recording the number of swings in a ball game comprising a plurality of holed beads and a cord that is passed through the holes of the beads and that holds the beads so that the beads can slide, the tool for recording the number of swings in a ball game characterized in that the cord is formed from a cord material that does not stretch in an axial direction but that stretches in a diametrical direction and that is normally urged in a diameter-expanding direction, and the cord is designed to constrict in diameter so as to elastically interlock with the walls of the holes of the beads and hold the beads in position.

In the means for solving the problems of the present invention, the cord material may be a solid elastic material having a cutout in the axial direction, a hollow elastic material, a substantially S-shaped elastic material in cross section, or another desired material. The solid or hollow elastic material may be a monofilament bundle or a shape memory alloy, or may be formed by bending a band-shaped strip of plain-woven fabric into the shape of the letter C or the letter U.

In the means for solving the problems of the present invention, the tool may be fashioned such that one end of the cord has a hanger, and the hanger is hooked on a pants belt or another object from which to hang the tool.

In the means for solving the problems of the present invention, the tool may be fashioned such that both ends of the cord are attached to the back-of-the-hand part of a glove for a ball game and are held on the glove.

In the means for solving the problems of the present invention, the cord may be designed such that linkers that can be linked to each other are included at both ends of the cord and the cord can be formed into a ring shape.

Another means for solving the problems of the present invention is to provide a tool for recording the number of swings in a ball game comprising a plurality of holed beads and a cord that is passed through the holes of the beads and that holds the beads so that the beads can slide, the tool for recording the number of swings in a ball game characterized in that the tool includes a plurality of tool units, the cord of the respective tool units is formed from a cord material that does not stretch in an axial direction but that stretches in a diametrical direction and that is normally urged in a diameter-expanding direction, and the cords are designed to constrict in diameter so as to elastically interlock with the walls of the holes of the beads and hold the beads in position.

In the other means for solving the problems of the present invention, a holder extending in a transverse direction is provided, and the plurality of tool units are hung from the holder in a spaced manner.

In the other means for solving the problems of the present invention, the plurality of tool units may be in the form of being continuous with each other in a longitudinal direction with spacers placed therebetween.

Advantageous Effects of the Invention

According to the swing number recording tool of the present invention, beads that move along a cord are interlocked with the cord and held in position using the elasticity of the cord, and the number of swings in a ball game can therefore be reliably recorded and confirmed without any unintentional shifting of the beads along the cord even when a player carrying the tool rotates their body during playing and strong deflection is imparted to the tool.

The tool of the present invention can be assembled merely by passing the cord through the holes in the beads while the cord is constricted diametrically, and an easily assembled swing number recording tool can therefore be provided at low cost.

BRIEF DESCRIPTION OF THE DRAWINGS

FIG. 1 shows a tool for recording the number of swings in a ball game according to one embodiment of the present invention, wherein FIG. 1(A) is a front view thereof and FIG. 1(B) is a longitudinal side cross-sectional view thereof;

FIG. 2 shows a modification of the tool for recording the number of swings in a ball game of FIG. 1, wherein FIG. 2(A) is a front view thereof and FIG. 2(B) is a longitudinal side cross-sectional view thereof;

FIG. 3 shows a cord used in the present invention, wherein FIG. 3(A) through (E) are cross-sectional views of five different examples;

FIG. 4 shows a tool for recording the number of swings in a ball game according to another different embodiment of the present invention, wherein FIG. 4(A) is a front view of a state in which the beads have been cleared, and FIG. 4(B) is a front view showing an example of recording the number of swings;

FIG. 5 shows a modification of the tool for recording the number of swings in a ball game of FIG. 4, wherein FIG. 5(A) is a front view of a state in which the beads have been cleared, and FIG. 5(B) is a front view showing an example of recording the number of swings;

FIG. 8 is a front view of another different embodiment of the present invention and the states of use thereof, wherein FIG. 8(A) shows a state in which the first hole has been finished in five swings, FIG. 8(B) shows a state in which the first hole has been finished in seven swings and the second hole has been finished in five swings, and FIG. 8(C) shows a state representing the total number of swings after a player has holed out at the final hole; FIG. 9(B) is a longitudinal cross-sectional view of the tool of FIG. 9(A).

MODE FOR CARRYING OUT THE INVENTION

Figure 1:
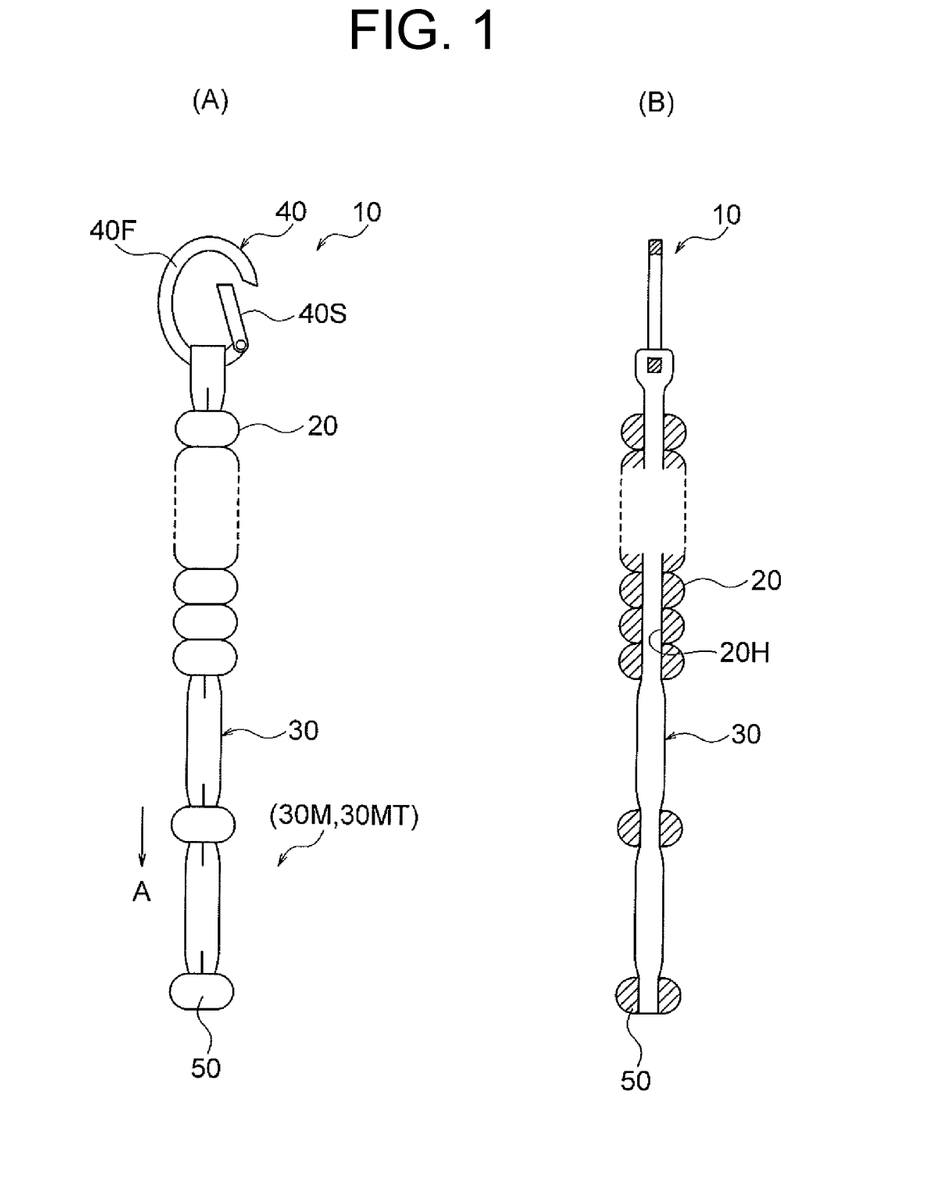

Describing the embodiments of the present invention in detail with reference to the drawings, FIG. 1 shows a tool 10 for recording the number of swings in a ball game according to a basic embodiment of the present invention, and this swing number recording tool 10 comprises a plurality of beads 20, each of which has a hole 20H (see FIG. 1(B)), and a cord 30 that is passed through the holes 20H of the beads 20 to hold the beads 20 so that the beads 20 are free to slide.

In the illustrated embodiment, the tool 10 may have a hanger 40 comprising a hook 40F with a spring lid 40S attached to one end of the cord 30, and a suitable retainer 50 that is attached to the other end of the cord 30 to retain the beads 20.

The number of beads 20 corresponds to the maximum number of swings in the ball game, and may be set to, e.g., the maximum number of swings established by the local rules of a golf tournament, i.e., when the stipulated number of swings (par) is five, normally the maximum number would be thrice, or fifteen, but because there are also cases of the stipulated number of swings being six, the number of beads can also be eighteen. However, thrice the number of swings is normally a forfeit and the count therefore rarely reaches that high; therefore, the number of beads may be, e.g., about ten.

The beads 20 may be molded from plastic, hard rubber, or another material. Additionally, all or some of the beads may be the same color, or the beads may be different colors by group (see FIG. 8). The outer shape of the beads may be rounded from top to bottom, or the top to bottom may be a linear cylindrical shape.

The cord 30 may be formed from a cord material 30M that does not stretch in an axial direction but that stretches in a diametrical direction and that is normally urged in an expanding-diameter direction. This cord 30 expands so as to elastically interlock with the walls of the holes 20H of the beads 20, so that the beads 20 are held at prescribed positions on the cord 30.

Figure 3:
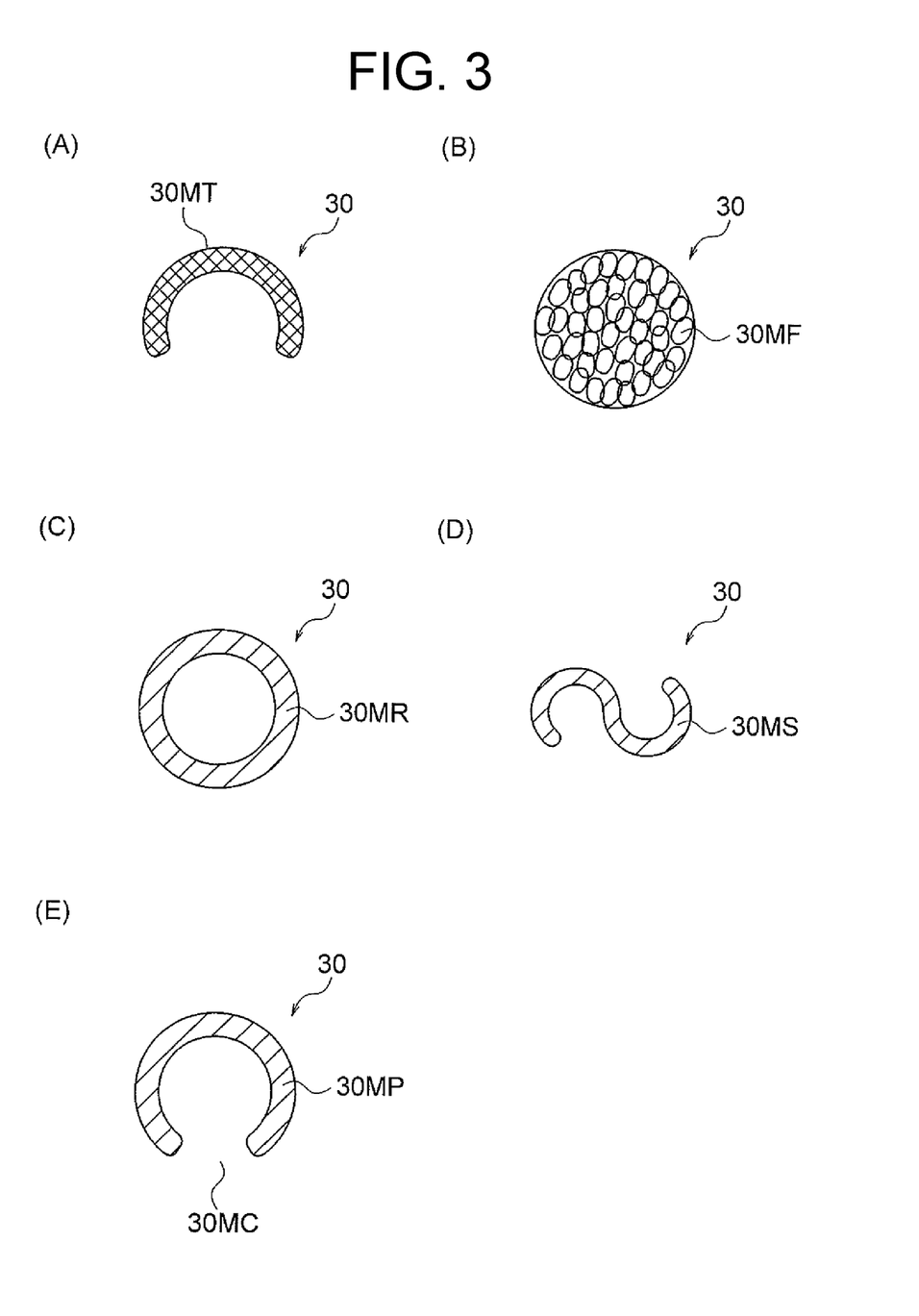

In the embodiment of FIG. 1, the cord material 30M comprises an elastic cord material 30MT formed by bending a long band-shaped strip of plain-woven fabric into the shape of the letter U or the letter C, as shown in FIG. 3(A), and the cord material 30M stretches in the diametrical direction to be imparted with elasticity so that the opening between the end edges of the band is opened and closed by expanding-direction urging force that would cause the long strip to return to a band shape. This elastic material 30MT, other than being a band of plain-woven fabric, may also be a band of a shape memory alloy.

The method of using the swing number recording tool of FIG. 1 shall now be described. The tool 10 is carried by being hung by the hanger 40 on a location such as the player's belt. To clear the count of the previous hole before play is started at each hole, all of the beads 20 are drawn up to the upper end side (the side of the hanger 40) of the cord 30 in FIGS. 1(A) and 1(B). Next, the bead 20 at the lowest end is moved by hand toward the retainer 50 with every swing of the play at the hole in question, as shown by the arrow A in FIG. 1(A). As described previously, the cord 30 interlocks with the walls of the holes 20H of the beads 20 due to the diametrical elasticity of the cord; therefore, the beads 20 are held in position on the cord 30 and the beads 20 for recording the number of swings do not shift even if vibration is imparted to the tool 10 due to an action such as the player shaking the club. Additionally, with each swing, the procedure of moving a bead 20 can be performed smoothly while the bead 20 forcefully constricts the cord 30 diametrically.

Thus, when the player holes out at the hole in question, the number of swings at the hole in question can be recorded and confirmed from the number of beads 20 on the retainer 50 side. Every time there is a replay at the hole in question due to an "OB" or a "hit into a pond," two beads are moved toward the retainer 50 and the number of swings can be recorded.

In the usage method described above, because all of the beads 20 are drawn up to the hanger 40 side and moved to the retainer 50 side with each swing for the number of swings to be recorded, when the tool 10 is hung on, e.g., the player's belt via the hanger 40, the beads 20 can be displaced to the recording side (the retainer 50 side) merely by being pulled downwardly by the finger. However, conversely, the beads 20 can also all be drawn to the retainer 50 side and then drawn back up to the hanger 40 side with each swing to record the number of swings. In this case, when the beads 20 shift along the cord 30, the end of the cord on the retainer 50 side must be held which makes the recording procedure troublesome, and it is therefore preferable to record the number of swings by shifting the beads downward.

Figure 2:
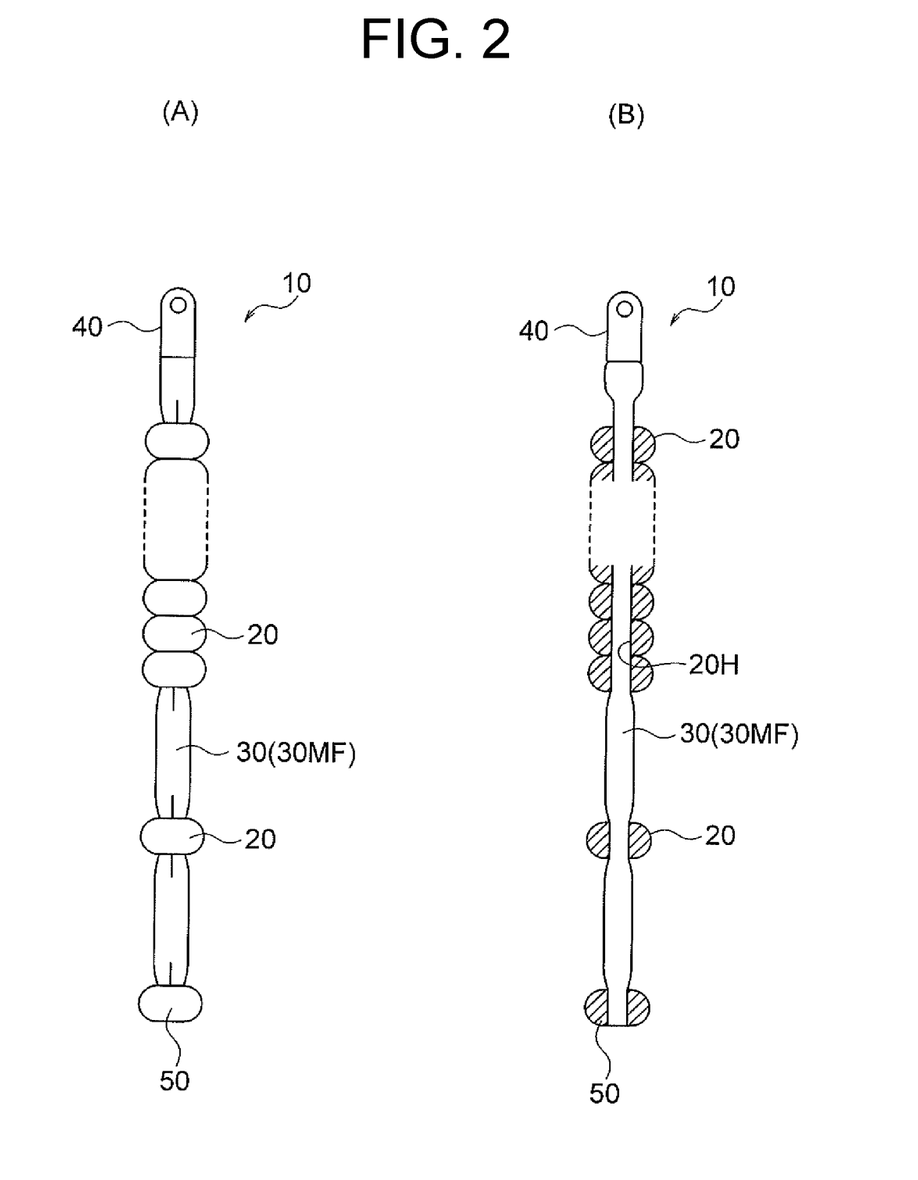

A modification of the present invention is shown in FIG. 2, and in this modification, the cord 30 comprises an elastic cord material 30MF made of a bundle of monofilament hollow fibers, as shown in FIG. 3(B). In this modification as well, the cord 30 can hold the beads 20 in position on the cord 30 due to the elasticity of the hollow fiber bundle of the cord material 30MF, and when the beads 20 are moved, the beads 20 can be moved smoothly while the cord 30 is constricted diametrically by the walls of the holes 20H of the beads 20.

Aside from the embodiments in FIGS. 1 and 2, the cord 30 may be formed from a hollow pipe of elastic cord material 30MR such as rubber or plastic as shown in FIG. 3(C), formed from an S-shaped cord elastic material 30MS made of rubber or plastic as shown in FIG. 3(D), or formed from a cutout hollow pipe of cord elastic material 30MP made of rubber or plastic as shown in FIG. 3(E). If the cord 30 is elastic enough to constrict diametrically, the cord 30 can be fashioned into any embodiment other than those shown in FIGS. 3(A) to 3(E).

Figure 7:
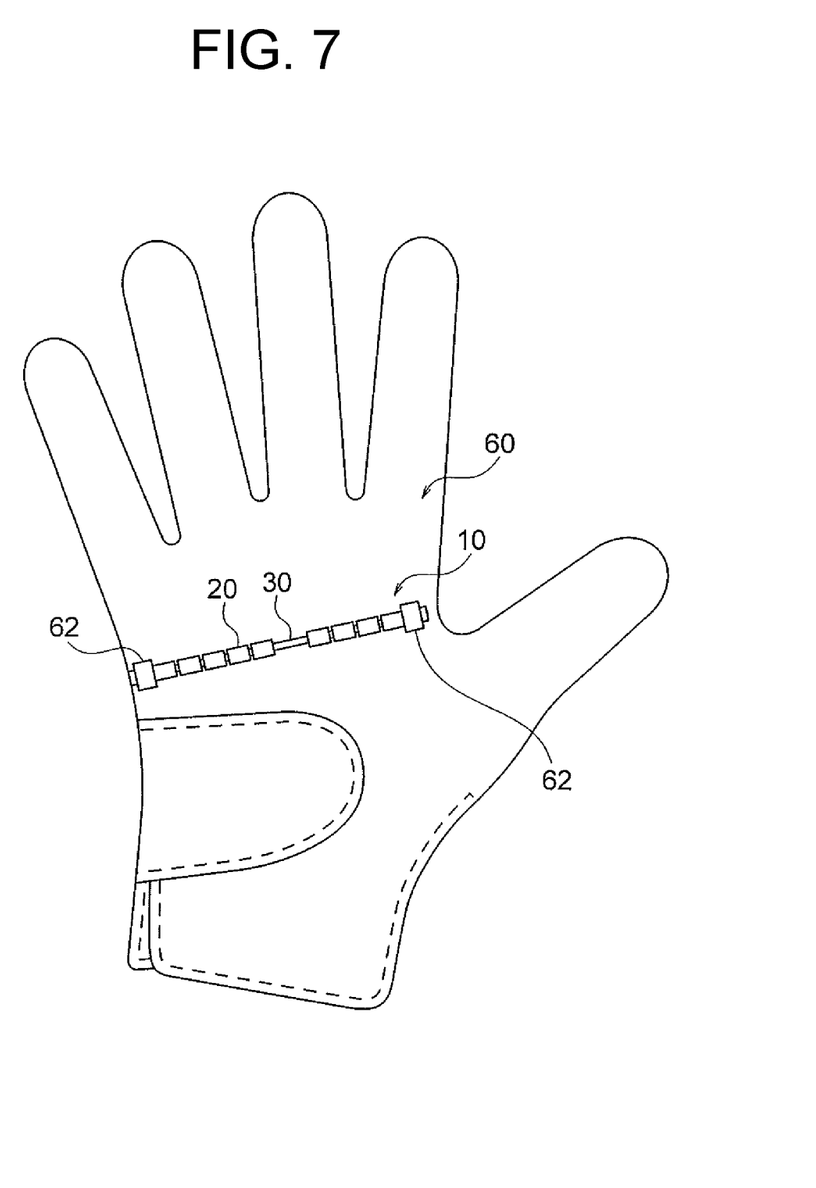
FIG. 7 is a front view of a state in which the tool for recording the number of swings in a ball game in the form of FIG. 1 has been attached to a glove.

The swing number recording tool 10 of the embodiment in FIG. 1 or 2 can assume a form such that instead of the hanger 40 and retainer 50, both ends of the cord 30 may be attached to the back-of-the-hand part of a ball game glove 60, such as a golf glove, and held on the glove 60 as shown in FIG. 7. In this case, both ends of the cord 30 preferably have suitable attaching pieces 62 that can be stitched, glued, or otherwise fastened to the back-of-the hand face of the glove.

Figure 4:
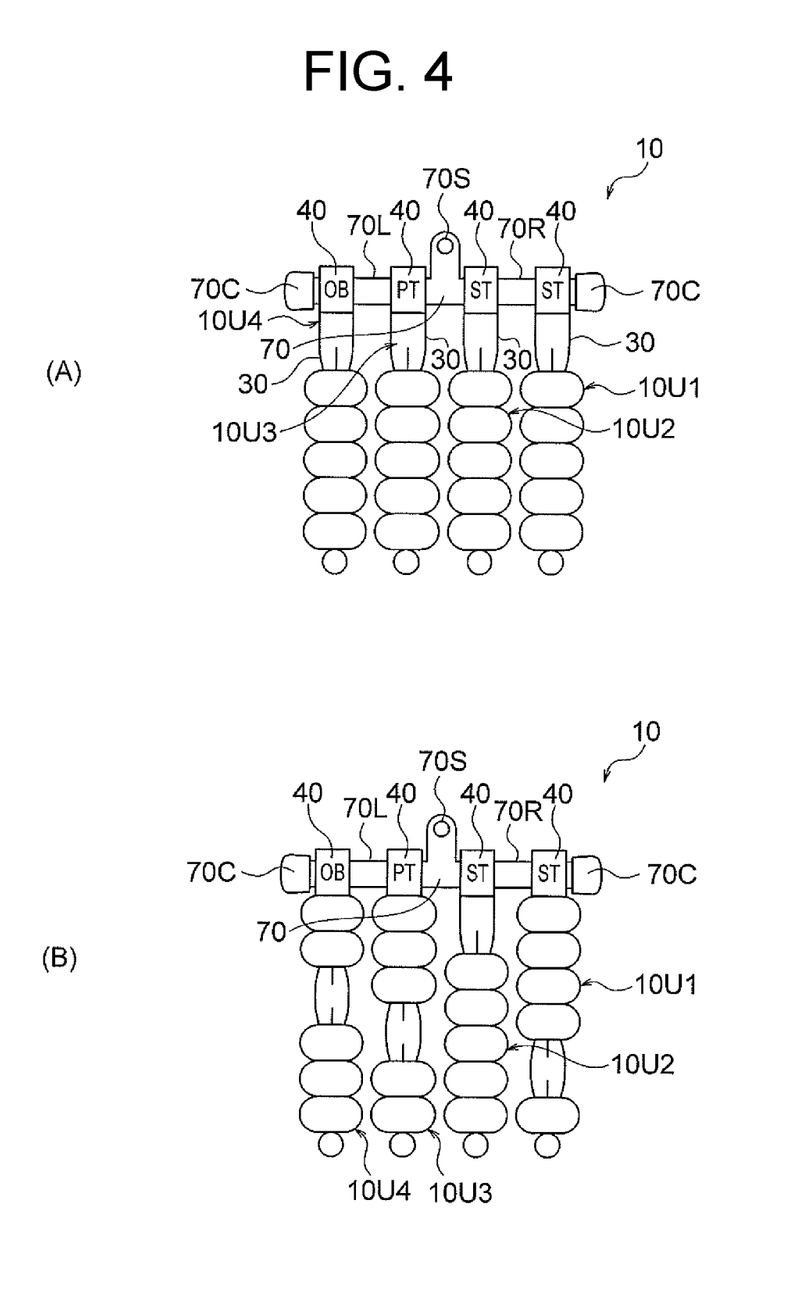
Figure 5:
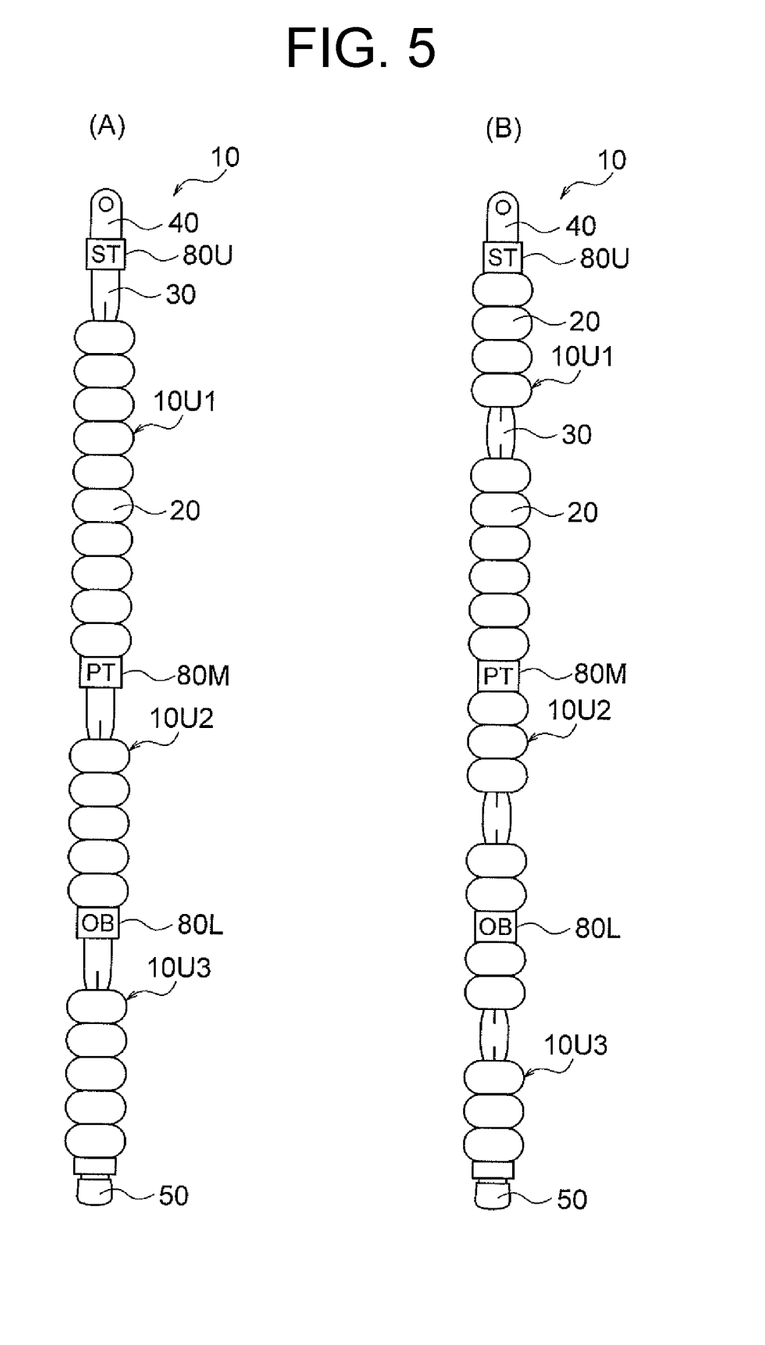

Other embodiments of the present invention are shown in FIGS. 4 and 5. In these embodiments, the swing number recording tool 10 comprises a plurality of tool units 10U1 to 10U4 (FIG. 4) or 10U1 to 10U3 (FIG. 5).

In the embodiment of FIG. 4, the plurality of tool units 10U1 to 10U4 are aligned and hung at intervals on a holder 70 extending in a transverse direction. This holder 70 has a hanging part 70S in the middle, and on the right side, upper-end ring-shaped hangers 40 of the cords 30 of the tool units 10U1, 10U2 are fitted at intervals via a collar 70R, while similarly, on the left side, upper-end ring-shaped hangers 40 of the cords 30 of the tool units 10U3, 10U4 are fitted at intervals via a collar 70L. The tool units 10U2 and 10U3 are spaced apart by the hanging part 70S. In FIG. 4, the symbols 70C denote retainers that are attached at both ends of the holder 70 and that retain the tool units 10U.

The cords 30 of the tool units 10U, similar to the tools of FIGS. 1 and 2, are formed from a cord material 30M that does not stretch in the axial direction but that stretches in the diametrical direction and that is normally urged in the diameter-expanding direction, and the cords 30 are designed to diametrically constrict so as to elastically interlock with the walls of the holes 20H of the beads 20 to hold the beads at prescribed positions on the cords 30.

In the embodiment of FIG. 5, the plurality of tool units 10U1 to 10U3 have a shared cord 30, and these tool units 10U1 to 10U3 are continuous with each other in a longitudinal direction with fixed spacers 80U, 80M, 80L placed therebetween.

In the embodiment of FIG. 4, the tool units 10U1 to 10U4 are used to record the number of swings for, from the right, the first stroke, the second stroke, the putter, and OB, and the letters "ST," "PT," and "OB" are displayed on the hanger 40 of each cord 30. The number of swings made to reach the green is displayed by moving (shifting) the "ST" beads, the number of swings made on the green is displayed by moving (shifting) the "PT" beads, and in the event of an OB, the number of swings is displayed by moving (shifting) the "OB" beads. Other usage methods are the same as the embodiments of FIGS. 1 and 2 in a clear state, excluding when the beads 20 are drawn upward. FIG. 4(B) shows one example in which the green was reached in four swings, there was one OB (two swings), and three swings were made with the putter, for a total of nine swings.

In the embodiment of FIG. 5 as well, until the green is reached, with each swing a bead 20 is moved (shifted) toward the fixed spacer 80U displaying the letters "ST," with each swing of the putter on the green a bead 20 is moved (shifted) toward the fixed spacer 80M displaying the letters "PT," and when there has been an OB, two beads 20 are moved (shifted) toward the fixed spacer 80L displaying the letters "OB." FIG. 5(B) shows an example in which the green is reached in four swings, there is one OB for two swings, and three swings are made with the putter on the green, for a total of nine swings.

Figure 6:
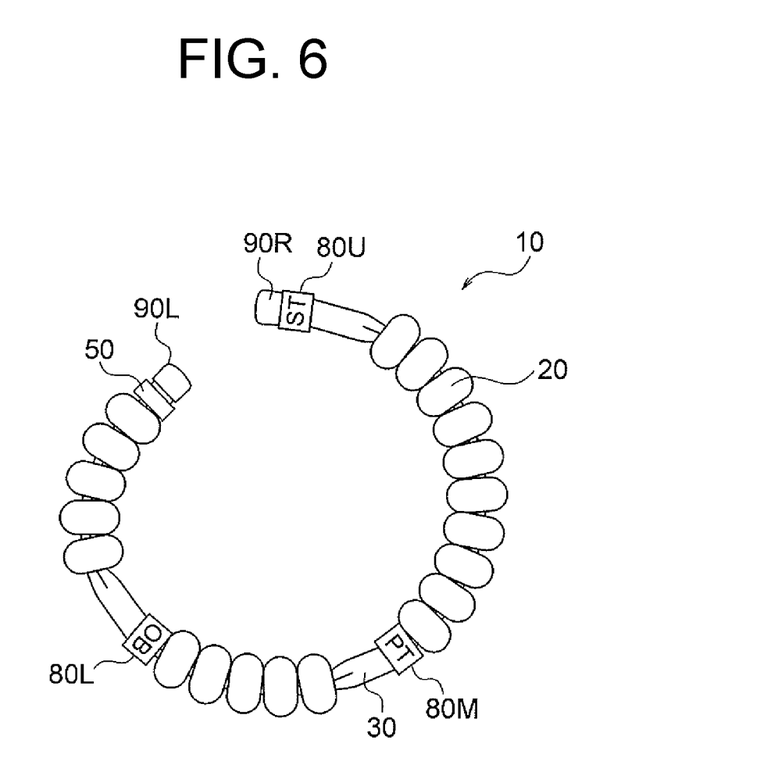
FIG. 6 is a front view of a different form of the tool for recording the number of swings in a ball game derived from the form of FIG. 5.

In the swing number recording tool 10 of the embodiment of FIG. 5, instead of having a hanger 40 and a retainer 50, the cord 30 at both ends includes linkers 90L, 90R that may be linked together magnetically or mechanically, and the cord 30 can be formed into a ring shape by these linkers 90L, 90R, as shown in FIG. 6. When designed in this manner, the tool 10 can be worn on the wrist or neck and used as a bracelet or necklace. As shall be apparent, a tool having only one tool unit as shown in FIGS. 1 and 2 can be used in the shape of a ring as shown in FIG. 6, but in this case, the cord portion worn on the neck would be outside of the movement range of the beads 20 and unrelated to recording the number of swings, and would merely have the function of simply being worn on the neck.

Figure 8:
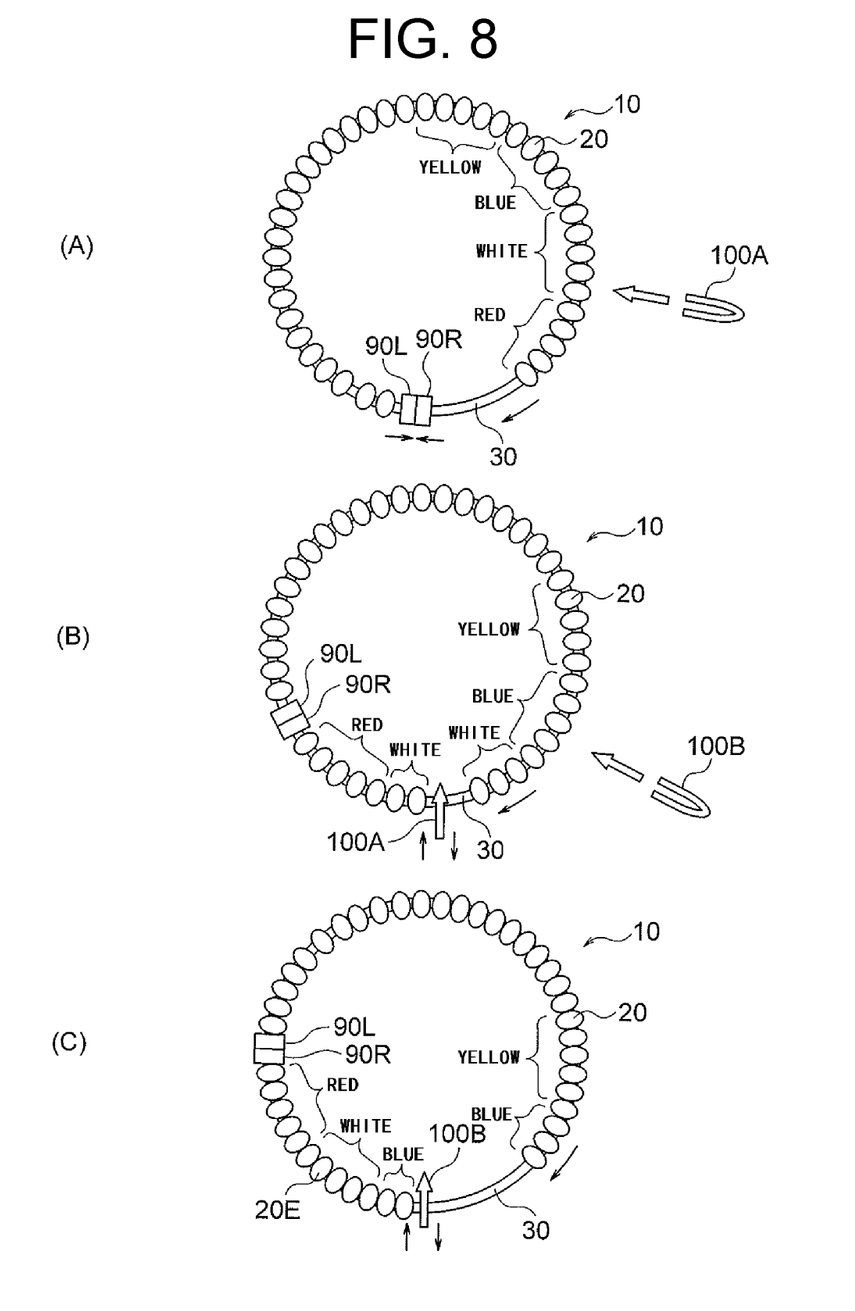

Yet another embodiment of the present invention is shown in FIG. 8. In this embodiment, the tool comprises a long cord 30 and numerous beads 20 through which the cord 30 passes, both ends of the cord 30 can be linked into a ring shape by suitable linkers 90L, 90R that are either magnetic or mechanical, and the numerous beads 20 comprise a plurality of bead groups 20G sorted by color in plurality of beads, e.g., every five beads. For example, every five beads 20 are colors as "red," "white," "blue," or "yellow," as illustrated. Doing so makes it easy to calculate the number of swings after holing out.

In FIG. 8(A), with each swing a bead 20 is moved clockwise to the linker 90R side (the beads 20 have not been moved in FIG. 8(A), but with each swing, a bead is moved as shown by the arrow A). Assuming that the player holes out in seven swings, a clip 100A is fastened to the portion of the cord 30 between the seventh bead 20S and the next bead 20N, and the number of beads 20 downstream of this clip 100A in the clockwise direction is the number of swings at the first hole.

In this embodiment, the number of swings at the previous hole remains recorded by the clip 100A, and when the player proceeds to the next hole, the beads 20 counterclockwise from the clip 100A have the role of recording the number of swings at the next hole; therefore, there is no need to return the beads 20 to either side to clear the beads as in the embodiments of FIGS. 1 and 2, and the tool is easier to use.

FIG. 8(B) shows an example in which the beads 20 shown in FIG. 8(A), which display that there were seven swings at the first hole, are all together with the clip 100A drawn to the linker 90R and the number of swings at the next hole are recorded. Assuming the number of swings at the second hole is five, a second clip 100B is fastened to the cord portion between the bead 20 corresponding to the fifth swing and the bead 20 adjacent thereto along the counterclockwise direction, the first clip 100A is taken off, and five beads 20 corresponding to the five swings of the second hole are moved clockwise to the linker 90R side so that the beads 20 corresponding to the number of swings of the second hole are together with the second clip 100B brought adjacent to the last bead 20E of the first hole.

FIG. 8(C) shows the result, which is that the second hole is finished with twelve swings. The same procedure is then sequentially repeated, and after the player holes out at the ninth hole, the total number of swings is known from the total count of the beads. In FIG. 8(C), the first clip 100A had been taken off, but the first clip 100A may be left on while the second clip is fastened on the upstream side of the beads 20 corresponding to the number of swings of the second hole, and the same procedure may be repeated thereafter. Assuming that all clips corresponding to the respective holes are left on, the number of swings at each hole can be written on a score card after all of the plays or half of the plays have ended.

In the embodiments described above, examples were described of cases in which the swing number recording tool records the number of swings in golf, but the tool can be similarly applied in tennis and other ball games.

INDUSTRIAL APPLICABILITY

According to the present invention, because the beads displaying the number of swings are interlocked with the cord and held in position using the elasticity of the cord, the beads do not shift along the cord even if great deflection is imparted to the tool by an action such as rotation of the body of the player carrying the tool, the number of swings in the ball game can be reliably recorded and confirmed, and the tool can be assembled merely by passing the cord through the holes in the beads while diametrically constricting the cord; therefore, an easily assembled swing number recording tool can be provided at low cost, and the present invention has industrial applicability.

EXPLANATION OF NUMERALS AND CHARACTERS

Swing number recording tool
10U1 to 10U4 Tool units
20 Beads
20H Holes
30 Cord
30M, 30MT, 30MF, 30MR, 30MS, 30MP Cord material
30MC Cutout
40 Hanger
50 Retainer
60 Glove
62 Attaching piece
70 Holder
70S Hanger
70R, 70L Collars
70C Retainer
80U, 80M, 80L Fixing spacers
90R, 90L Linkers
100A, 100B Clips

The invention claimed is:

1. A tool for recording the number of swings in a ball game comprising a plurality of holed beads and a cord that is passed through the holes of the beads and that holds the beads so that the beads can slide, the tool for recording the number of swings in a ball game characterized in that the cord is formed from a cord material that does not stretch in an axial direction and that the cord material comprises a long band-shaped strip urged to return to a band shape even if bent, wherein the cord material is bent into U or C-shaped portions passed through the holes of the beads so that a whole outer face of the cord material elastically interlocks with walls of the holes of the beads by an urging force that causes the long strip to return to the band shape to thereby hold the beads in position and the cord material expands so as to return to the band shape to thereby form band shape portions at portions of the cord material that do not have the beads disposed thereon, whereby the band shape portions comprise a width that is wider than diameters of the respective holes to prevent the beads from shifting along the cord material.

2. The tool for recording the number of swings in a ball game as set forth in claim 1, wherein the long band-shaped strip is a band of plain-woven fabric or a band of a shape memory alloy.

3. The tool for recording the number of swings in a ball game as set forth in claim 1, wherein one end of the cord has a hanger, and the hanger is capable of being hooked on an object from which to hang the tool.

4. The tool for recording the number of swings in a ball game as set forth in claim 1, wherein the ball game is golf, and the tool for recording the number of swings is further provided with a clip fastened to a portion of the cord between the plurality of beads so as to divide up the number of swings for each hole of golf played.

5. The tool for recording the number of swings in a ball game as set forth in claim 1, wherein both ends of the cord are attached to a back-of-the-hand part of a glove for a ball game and are held on the glove.

6. The tool for recording the number of swings in a ball game as set forth in claim 1, wherein one end of the cord has a hanger, and the hanger is capable of being hooked on an object from which to hang the tool and wherein the ball game is golf, and the tool for recording the number of swings is further provided with a clip fastened to a portion of the cord between the beads so as to divide up the number of swings for each hole of golf played.

7. The tool for recording the number of swings in a ball game as set forth in any of claim 1, wherein one end of the cord has a hanger, and the hanger is capable of being hooked on an object from which to hang the tool and wherein both ends of the cord are attached to a back-of-the-hand part of a glove for a ball game and are held on the glove.

8. A tool for recording the number of swings in a ball game comprising a plurality of holed beads and a cord that is passed through the holes of the beads and that holds the beads so that the beads can slide, wherein the tool for recording the number of swings in a ball game is characterized in that the tool includes a plurality of tool units, the cords of the respective tool units are formed from a cord material that does not stretch in an axial direction and that the cord material comprises a long band-shaped strip urged to return to a band shape even if bent, wherein the cord material is bent into U or C-shaped portions passed through the holes of the beads so that a whole outer face of the cord material elastically interlocks with walls of the holes of the beads by an urging force that causes the long strip to return to the band shape to thereby hold the beads in position and the cord material expands so as to return to the band shape to thereby form band shape portions at portions of the cord material that do not have the beads disposed thereon, whereby the band shape portions comprise a width that is wider than diameters of the respective holes to prevent the beads from shifting along the cord material.

9. The tool for recording the number of swings in a ball game as set forth in claim 8, wherein a holder extending in a transverse direction is also provided, and the plurality of tool units are hung at intervals from the holder.

\* \* \* \* \*

UNITED STATES PATENT AND TRADEMARK OFFICE
CERTIFICATE OF CORRECTION

| | | |
|---|---|---|
| PATENT NO. | : 11,173,371 B2 | Page 1 of 1 |
| APPLICATION NO. | : 15/778893 | |
| DATED | : November 16, 2021 | |
| INVENTOR(S) | : Masaei Watanabe | |

It is certified that error appears in the above-identified patent and that said Letters Patent is hereby corrected as shown below:

In the Specification

Column 1, Line 66:
"holes 411 in the beads 4" should be -- holes 4H in the beads 4 --

Signed and Sealed this
Thirtieth Day of August, 2022

Katherine Kelly Vidal
*Director of the United States Patent and Trademark Office*